US008086609B2

(12) United States Patent
Goyal et al.

(10) Patent No.: US 8,086,609 B2
(45) Date of Patent: Dec. 27, 2011

(54) GRAPH CACHING

(75) Inventors: Rajan Goyal, Saratoga, CA (US);
Muhammad Raghib Hussain, San Jose, CA (US); Trent Parker, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 576 days.

(21) Appl. No.: 11/982,391

(22) Filed: Nov. 1, 2007

(65) Prior Publication Data
US 2009/0119279 A1 May 7, 2009

(51) Int. Cl.
*G06F 17/30* (2006.01)
(52) U.S. Cl. ........................................ 707/739
(58) Field of Classification Search .................. None
See application file for complete search history.

(56) References Cited

U.S. PATENT DOCUMENTS

| | | | | |
|---|---|---|---|---|
| 5,781,757 A * | 7/1998 | Deshpande | ................... | 711/146 |
| 6,799,248 B2 * | 9/2004 | Scherr | .......................... | 711/118 |
| 2001/0021959 A1 * | 9/2001 | Holmberg et al. | ............ | 711/104 |
| 2002/0099909 A1 * | 7/2002 | Meyer | .......................... | 711/117 |
| 2005/0246700 A1 * | 11/2005 | Archambault et al. | ....... | 717/156 |
| 2006/0069872 A1 | 3/2006 | Bouchard et al. | | |
| 2006/0075206 A1 | 4/2006 | Bouchard et al. | | |
| 2006/0077979 A1 * | 4/2006 | Dubrovsky et al. | ........... | 370/394 |
| 2006/0085533 A1 | 4/2006 | Hussain et al. | | |
| 2006/0101195 A1 * | 5/2006 | Jain | ................................ | 711/104 |
| 2006/0265552 A1 * | 11/2006 | Davis et al. | .................... | 711/137 |
| 2007/0038798 A1 | 2/2007 | Bouchard et al. | | |
| 2008/0271141 A1 * | 10/2008 | Goldman et al. | ............... | 726/22 |

* cited by examiner

*Primary Examiner* — Neveen Abel Jalil
*Assistant Examiner* — Kevin Young
(74) *Attorney, Agent, or Firm* — Hamilton, Brook, Smith & Reynolds, P.C.

(57) ABSTRACT

In a method and apparatus for analyzing nodes of a Deterministic Finite Automata (DFA), an accessibility ranking, based on a DFA graph geometrical configuration, may be determined in order to determine cacheable portions of the DFA graph in order to reduce the number of external memory accesses. A walker process may be configured to walk the graph in a graph cache as well as main memory. The graph may be generated in a manner allowing each arc to include information if the node it is pointing to is stored in the graph cache or in main memory. The walker may use this information to determine whether or not to access the next arc in the graph cache or in main memory.

16 Claims, 7 Drawing Sheets

GRAPH CACHING

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc*xyz". That is, find the string "abc", followed by the string "xyz", with an unlimited number of characters in-between "abc" and "xyz". Another example is the regular expression "abc??abc*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as, Deterministic Finite Automata (DFA) to process the regular expression. The DFA processes an input stream of characters sequentially using a DFA graph and makes a state transition based on the current character and state.

SUMMARY

A processor, and a method for use of the processor, for efficiently storing and retrieving portions of a Deterministic Finite Automata (DFA) is presented. The processor may comprise a processing unit configured to analyze the searchable graph including a plurality of interconnected nodes to determine cacheable portions of the graph based on a geometrical configuration of the graph. The processor may also comprise a cache configured to cache the cacheable portions of the graph.

The processor unit may be further configured to determine an accessibility ranking for each node. The accessibility ranking may characterize the likelihood each node will be accessed during a search. The processing unit may also select the cacheable portions of the graph based on the accessibility ranking of the nodes.

The processing unit may be configured to determine the accessibility ranking by evaluating an in-degree and an out-degree of a node, wherein a greater in-degree or out-degree of the node results in a higher accessibility ranking. The accessibility ranking may also be determined by evaluating a distance from a node to a root node, with nodes closer to the root node having a higher accessibility ranking. The accessibility ranking may be determined by evaluating a heaviness of a node, wherein a heavier node comprises a higher accessibility ranking. The processing unit may be configured to adjust the accessibility ranking during a search of the graph, with the accessibility ranking increased if a node is frequently accessed. The determination of the accessibility ranking may take place during a graph compilation stage.

The cache may be configured to cache the cacheable portions of the graph during a loading stage of the graph. The cache may be configured to cache the cacheable portions of the graph based on an adjusted accessibility ranking. The cache may be located in an external or on-chip memory unit. The cache may also be dedicated to graph usage.

The walker may also be configured to walk the graph in the graph cache as well as main memory. The graph may be generated in a manner allowing each arc to include information if the node it is pointing to is stored in the graph cache or in main memory. The walker may use this information to determine whether or not to access the next arc in the graph cache or in main memory. The node structure of a node stored in the graph cache may be different from the node structure stored in external memory. The node structure of a node stored in the graph cache may be optimized as compared to the node structure of a node stored in the main memory.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1A:
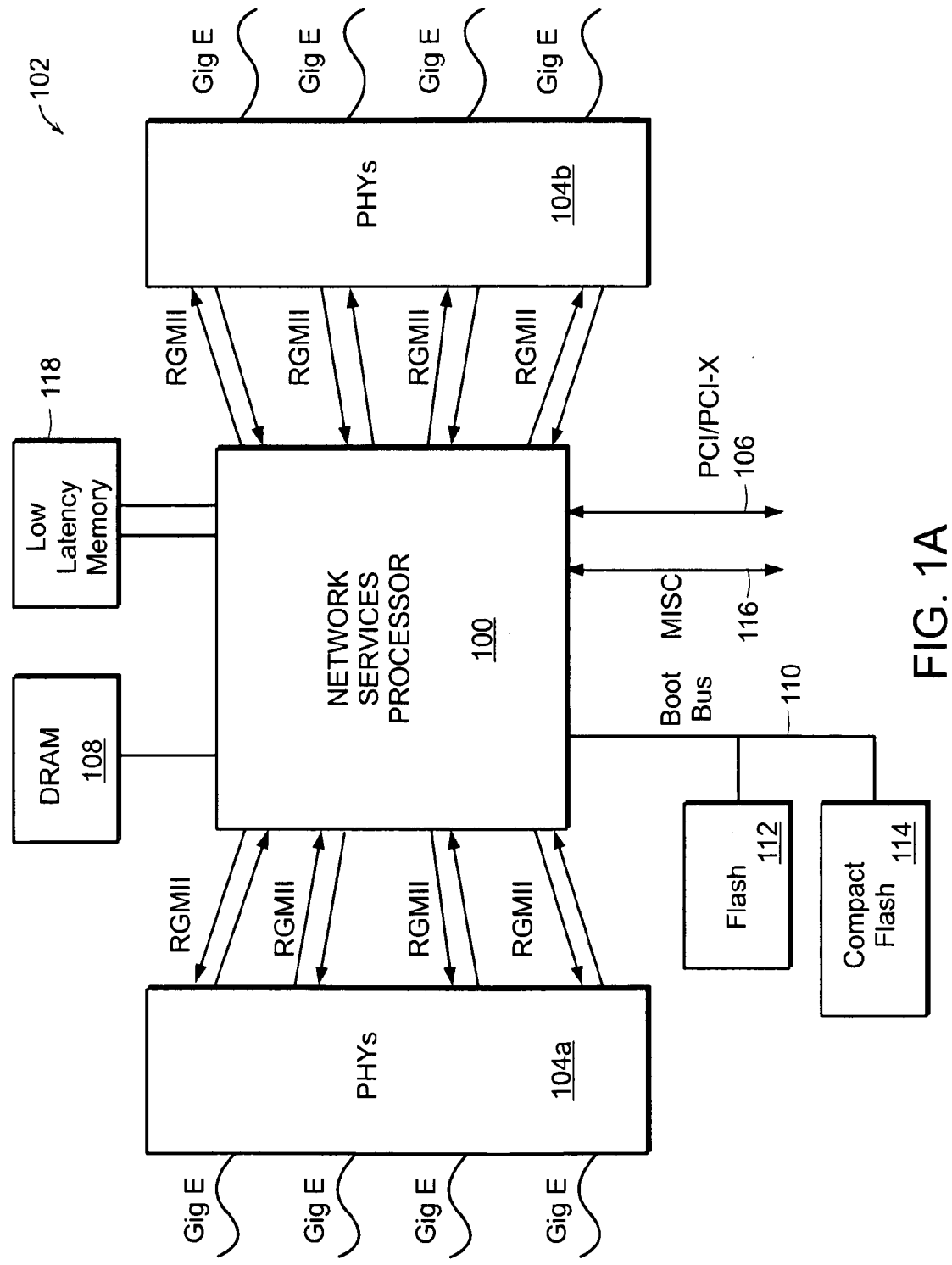
FIGS. 1A and 1B are block diagrams of a security appliance including a network services processor and a protocol processor, respectively.

FIG. 1A is a block diagram of an example security appliance 102 including a network services processor 100. The security appliance 102 may be a standalone system that may switch packets received at one Ethernet port (Gig E) to another Ethernet port (Gig E) and perform a plurality of security functions on received packets prior to forwarding the packets. For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 may include a plurality of Ethernet Media Access Control interfaces with standard Reduced Gigabyte Media Independent Interface (RGMII) connections to the off-chip PHYs 104a, 104b.

The network services processor 100 may also receive packets from the Ethernet ports (Gig E) through the physical interfaces PHY 104a, 104b, and perform L7-L2 network protocol processing on the received packets and forwards processed packets through the physical interfaces 104a, 104b to another hop in the network or the final destination or through the PCI bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a low latency memory controller for controlling low latency Dynamic Random Access Memory (DRAM) 118. The low latency DRAM 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security accelerate packet processing according to an embodiment of the present invention. The regular expression processing and pattern search may be used to perform string matching for AV and IDS applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA graph expression searches.

A boot bus 110 may provide the necessary boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

Figure 1B:
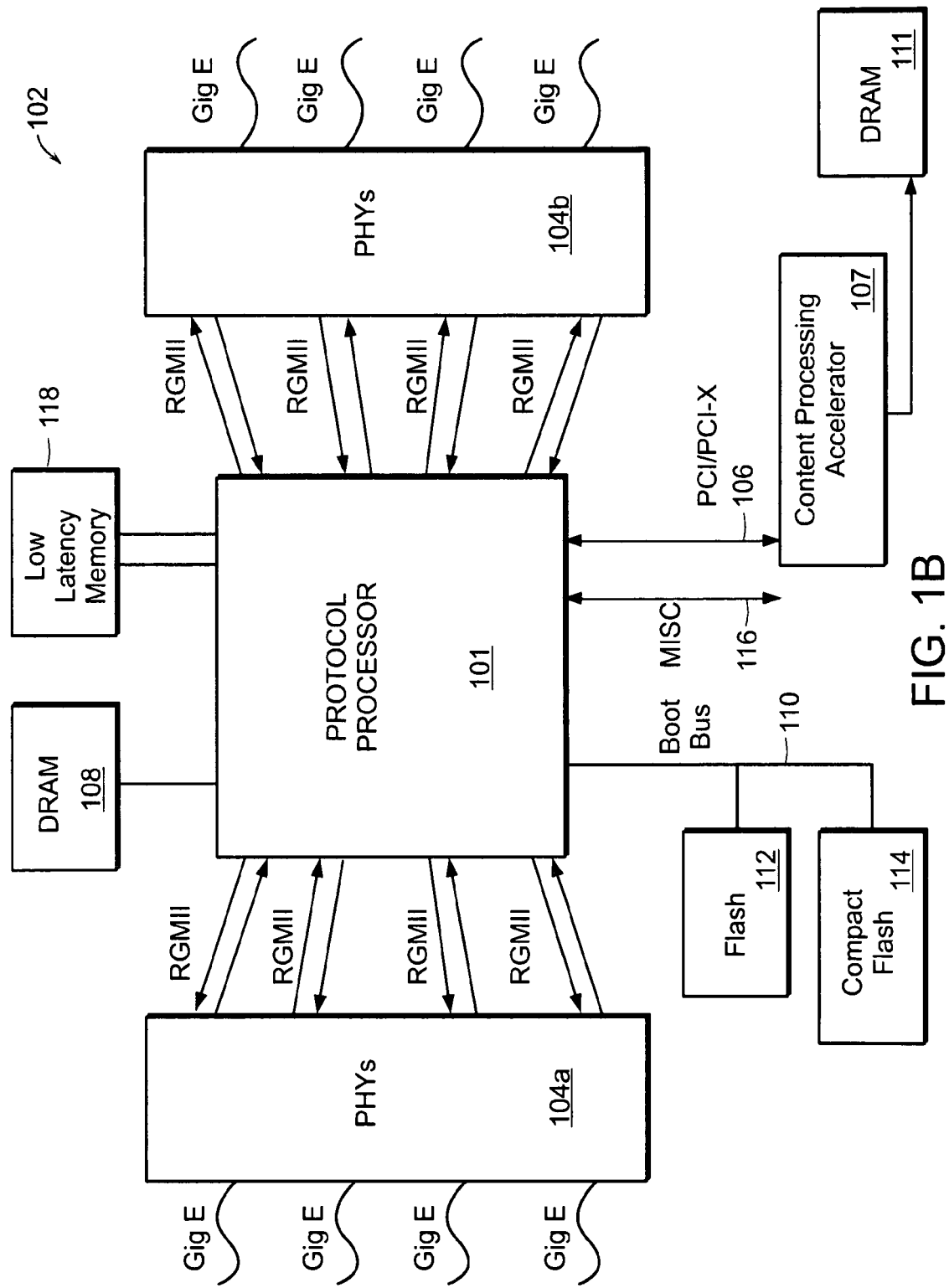

It should be appreciated that the example security appliance 102 may alternatively include a protocol processor 101 (FIG. 1B). The protocol processor 101 may include the element of the network services processor 100 with the addition of a content processing accelerator 107, connected to the processor 101 via the PCI/PCI-X connection 106, and an external DRAM 111 connected to the accelerator 107. The accelerator 107 and DRAM 111 may be employed in content search applications, therefore making all content searching operations external to the processor 101.

Figure 2:
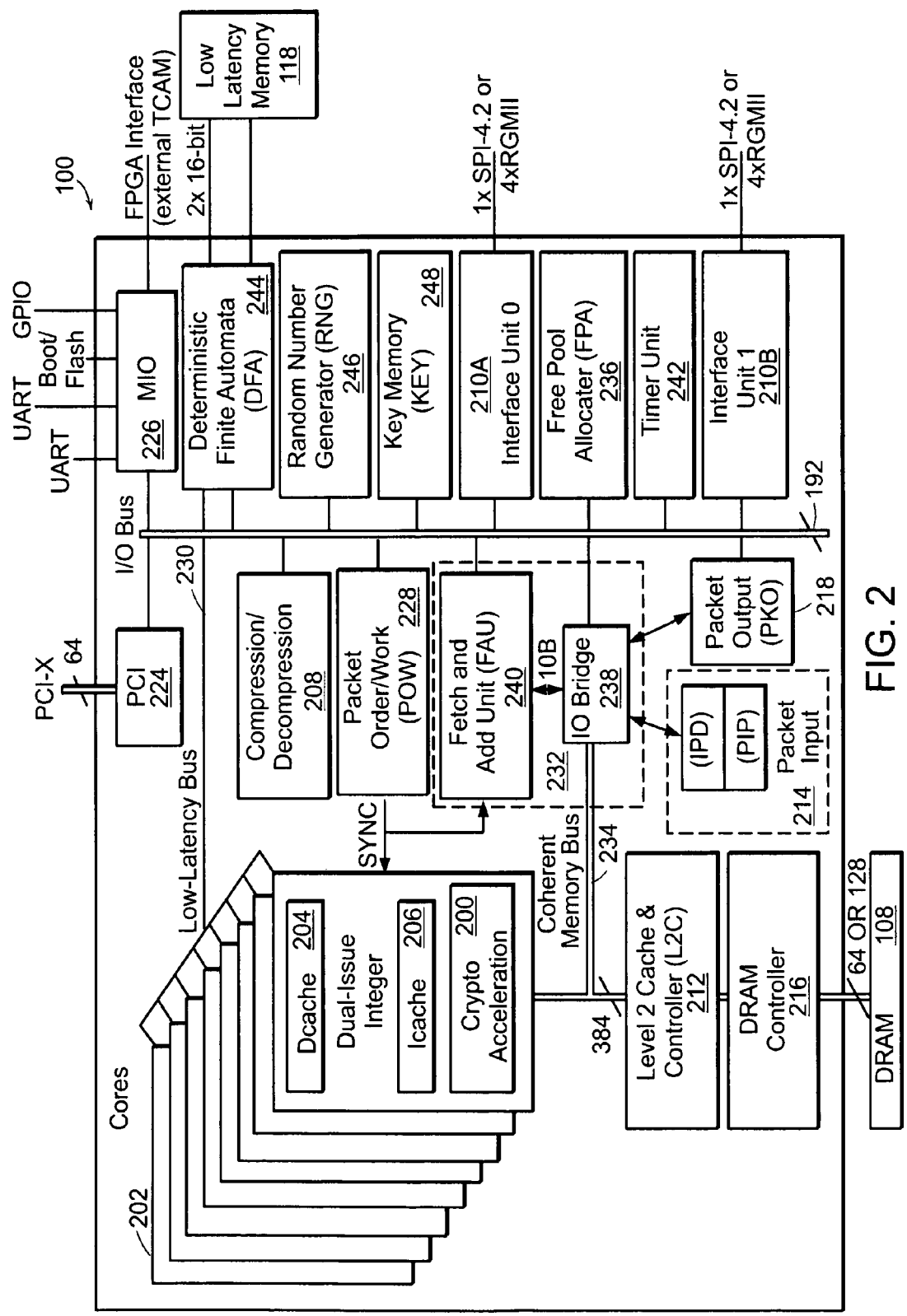
FIG. 2 is a block diagram of the network services processor shown in FIG. 1.

FIG. 2 is a block diagram of the network services processor 100, or the protocol processor 101 shown in FIGS. 1A and 1B, respectively. The network services processor 100, and/or the protocol processor 101, delivers high application performance using a plurality of processors (cores) 202 located on a L1 network protocol. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGM II interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/Virtual Private Network (VPN) packet. The processing of a Firewall/VPN packet may include the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external low latency memory 118. The memory subsystem is architected for multi-processor support and tuned to deliver both high-throughput and low-latency required by memory intensive content networking applications. Level 2 cache memory 212 and external DRAM memory 108 (FIG. 1) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a DFA co-processor 244 that performs Deterministic Finite Automata (DFA) and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 bypasses the L2 cache memory 212 and can be directly accessed from both the processors (cores) 202 and a DFA co-processor 244. In one embodiment, the latency to access the low-latency memory is less than 40 milliseconds.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing utilizes a deterministic finite Automata (DFA) to recognize a pattern in the content of a received packet. The DFA is a finite state machine, that is, a model of computation including a set of states, a start state, an input alphabet (set of all possible symbols) and a transition function that maps input symbols and current states to a next state. Computation begins in the start state and changes to new states dependent on the transition function. The DFA is deterministic, that is, the behavior can be completely predicted from the input. The pattern is a finite number of strings of characters (symbols) to search for in the input stream (string of characters).

The pattern is commonly expressed using a regular expression that includes atomic elements, for example, normal text characters such as, A-Z, 0-9 and meta-characters such as, *, ˆ and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct [ . . . ] allows listing of a list of characters to search for, e.g. gr[ea]y looks for both grey and gray. A dash indicates a range of characters, for example, [A-Z]. The meta-character "." matches any one character.

The input to the DFA state machine is typically a string of (8-bit) bytes, that is, the alphabet is a single byte (one character or symbol). Each byte in the input stream results in a transition from one state to another state.

The states and the transition functions can be represented by a graph, where each node in the graph represents a state and arcs in the graph represent state transitions. The current state of the state machine is represented by a node identifier that selects a particular graph node. The graph may be stored in low latency memory 118, or the main DRAM 108, and accessed by the processors 202 over the low latency bus. The processors 202 may access a DFA-based graph stored in the low latency memory, or the main DRAM 108, directly. The graph will be described later in conjunction with FIG. 5.

Figure 3:
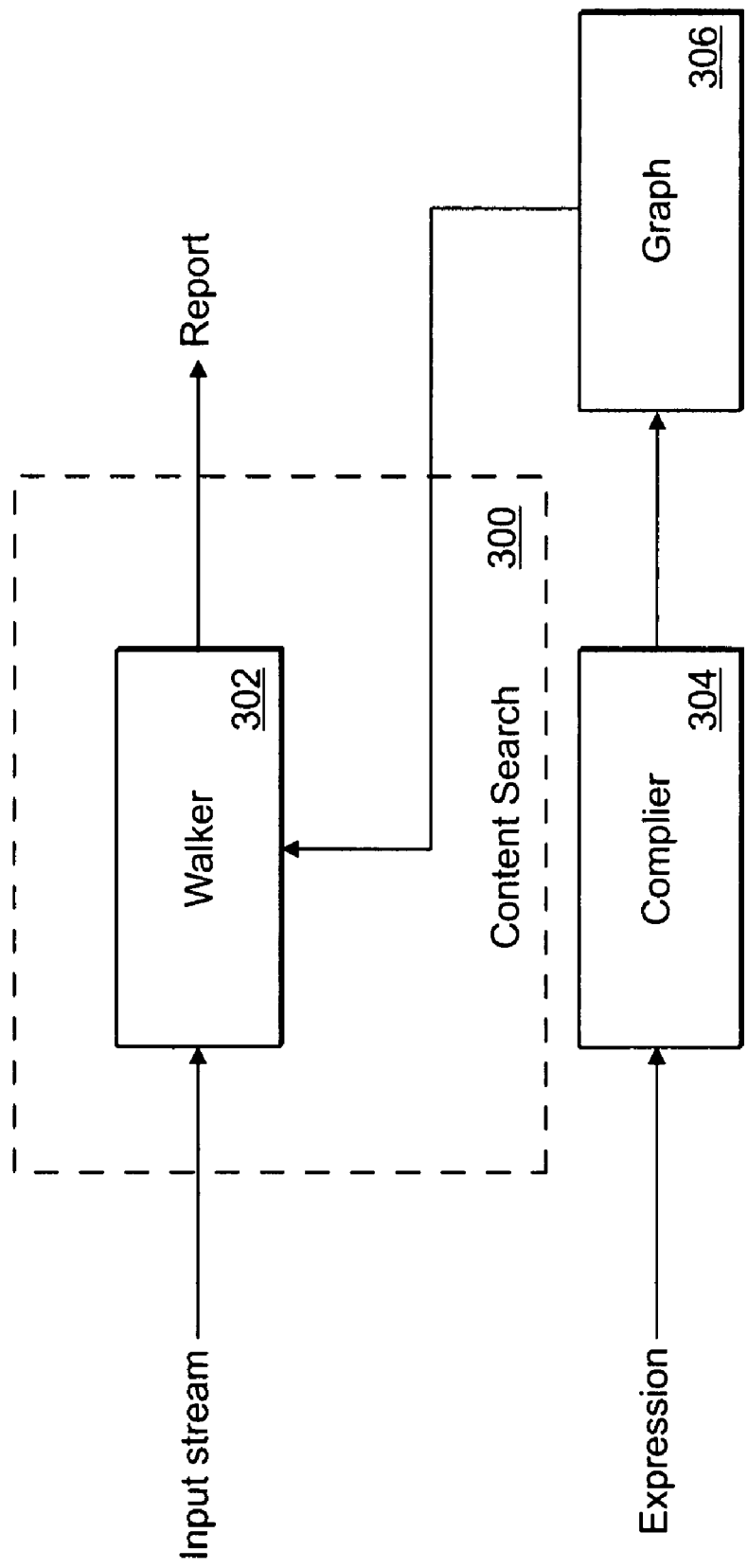
FIG. 3 is a block diagram illustrating content search elements used by the processor of FIGS. 1A and 1B.

FIG. 3 is a block diagram illustrating content search macros that may be used by a processor 202 in the network services processor 100 shown in FIG. 2. Content search macros 300 may include a walker software component (process) 302 for searching the DFA-based content search graph that may be generated via a compiler software component 304. The content search macros 300 may be stored in L2/DRAM (212, 108) and may be executed by a processor 202. The DFA-based content search graph may be stored in low latency memory 118 which is accessible directly by the processor 202 through the low latency bus and low-latency memory controller shown in FIG. 2. The compiler 304 translates expressions into a DFA-based content search graph with a plurality of nodes.

After the compiler 304 has generated the content search graph and the graph stored in low latency memory 118, or in main DRAM 108, the walker process 302 executed by one of the processors 202 walks input data (e.g., a string of characters) in the received data packet one character at a time and outputs a set of matches based on a search for a pattern in the input data using the content search graph.

Figure 4:
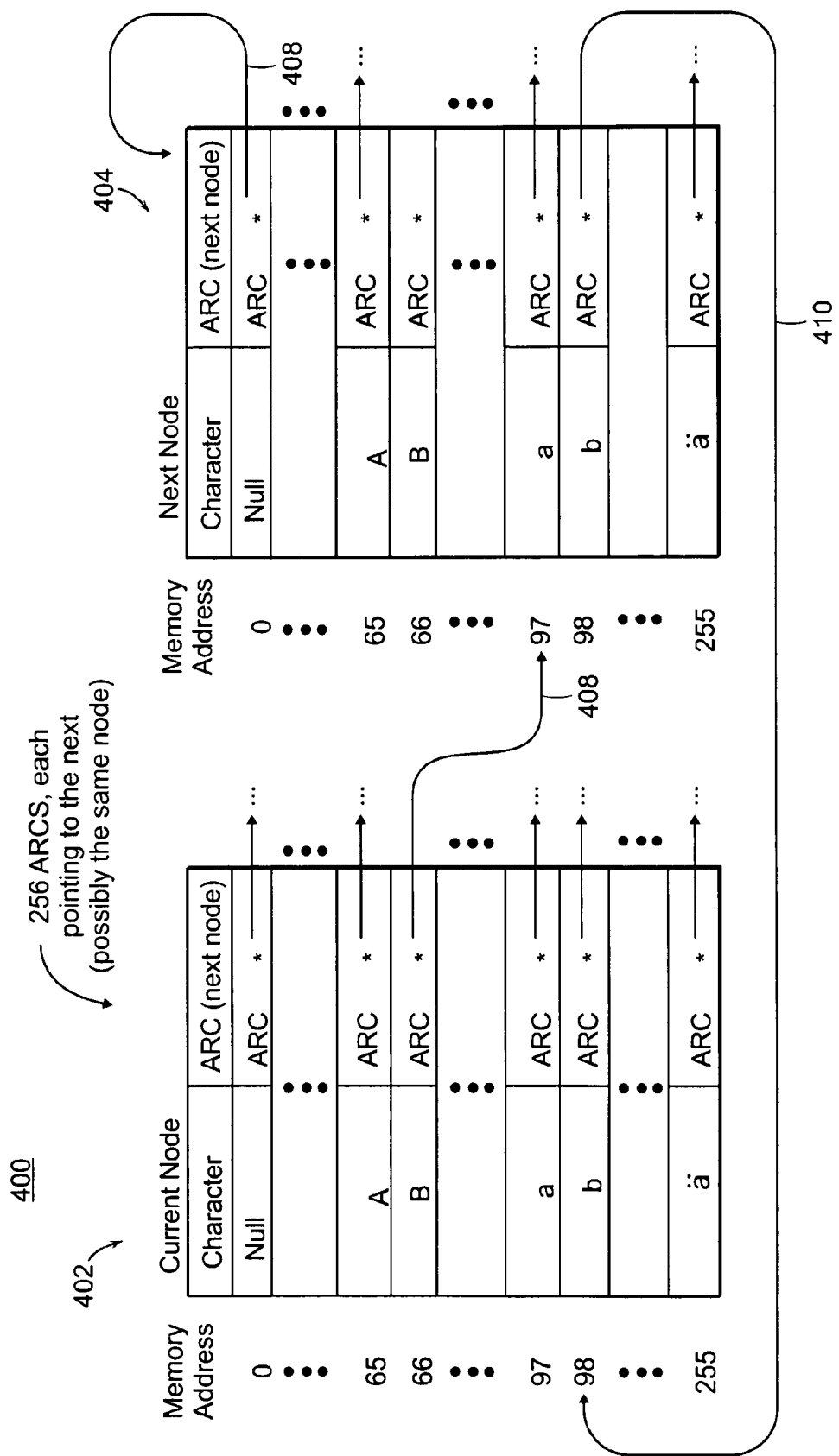
FIG. 4 is a block diagram of an example data structure that is used by the Content Search Mechanism (CSM) to traverse a graph.

FIG. 4 is a block diagram of an example of a typical data structure 400 that may be stored in Low Latency Memory Random Access Memory 118, or the main DRAM 108, and used by the Content Search Mechanism (CSM) executing in a processor 202 to traverse a graph. The data structure 400 may be generated by the compiler component 304 based on the expressions to be searched for in the input stream.

The data structure may include a plurality of nodes, for example nodes 402 and 404, that may be used in a content search graph according to an embodiment of the present invention. Each node in the graph may include an array of 256 next node pointers, one for each unique input byte value; that is, $2^8$ (256 possible values, or 256 addresses) representing an ASCII value of the input. Each next node pointer contains a next node ID that directly specifies the next node/state for the input byte value.

As shown in FIG. 4, a current node 402 comprises 256 arcs. Each arc represents an input ASCII value. For example, in node 404, the arc addressed as '97' includes a next node pointer for the character 'a.' Similarly, a next node 404 also comprises 256 arcs, each arc comprising a unique address and including a next node pointer for a corresponding ASCII value.

The arcs of a node may be forward arcs (e.g., arcs which point to next nodes in the DFA graph), backward arcs (e.g., arcs which point back to a root node or a prior node), or repeating arcs (e.g., arcs which point back to the node to which they are associated with). Arc 408 of node 404 comprises a node pointer to node 404, and is therefore an example of a repeating arc. Arc 410 of node 404 comprises a next node pointer to node 402, which in this context is considered to be a prior node, and therefore arc 410 is an example of a backward arc. In the example provided by FIG. 4, the arc addressed as '66' of current node 402 comprises a forward next node pointer 406 pointing to next node 404, representing a character match of 'B' with the input stream. It should be appreciated that although FIG. 4 only shows 2 nodes, any number of nodes may be included in a DFA based content search graph.

Figure 5:
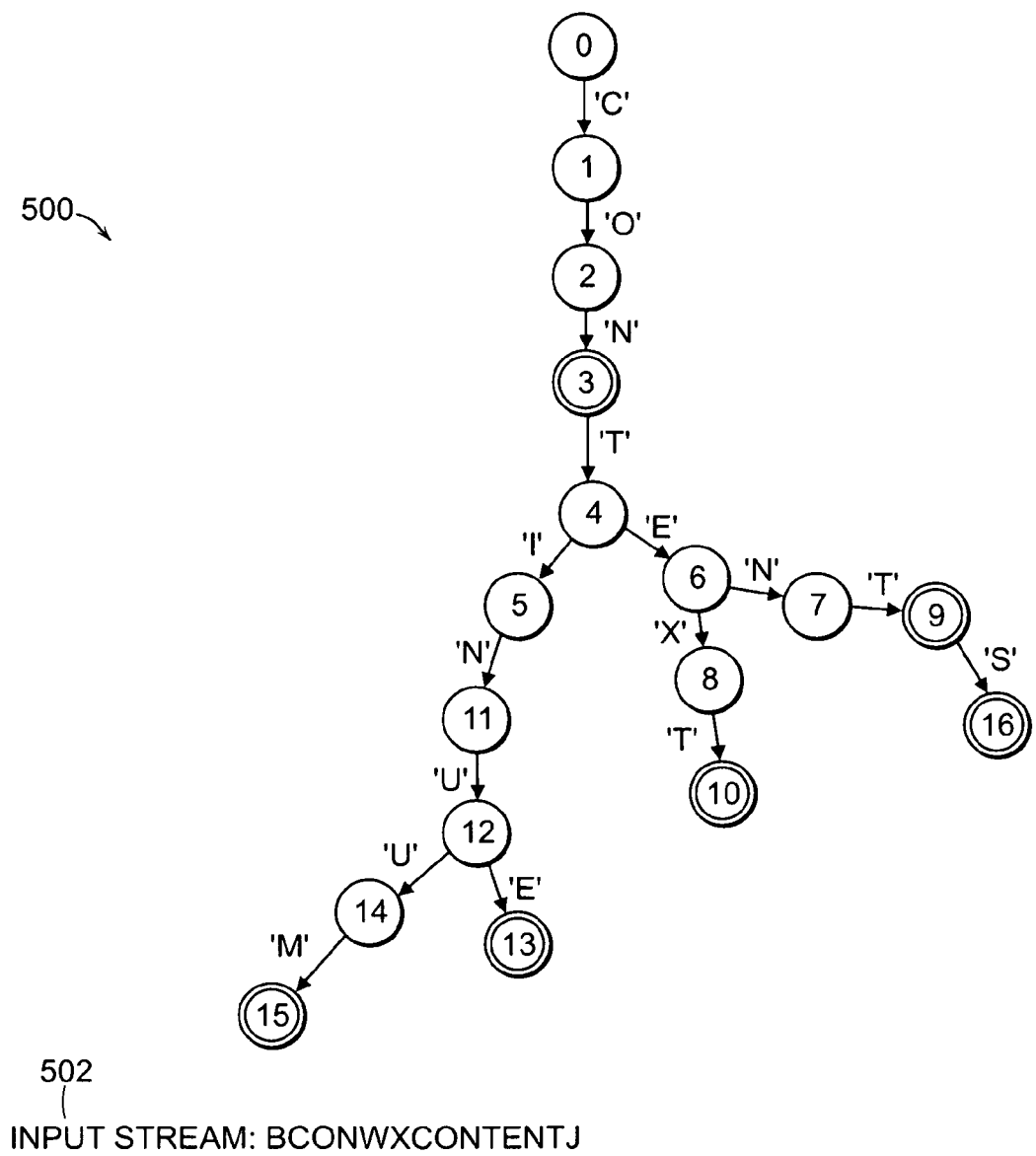
FIG. 5 is an example of a DFA graph.

FIG. 5 provides an example of a DFA graph 500 complied via the compiler 304. For simplicity, only forward arcs have been illustrated in the example graph 500. The node marked as '0' is the root node and is a starting position for traversing the graph 500 with the walker process 302. Each of the nodes are interconnected through arcs represented by the lines connecting each node. The arcs shown in FIG. 5 are forward arcs, or valid arcs, representing a character match between the expression being searched and an input character. The nodes comprising a double line (e.g., nodes 3, 9, 10, 13, 15, and 16) are referred to as mark nodes and represent a string match in the input stream. For example, the double line around node 3 represents a string match of 'CON'; node 9 represents a string match of 'CONTENT'; node 10 represents a string match of 'CONTEXT'; node 13 represents a string match of 'CONTINUE'; node 15 represents a string match of 'CONTINUUM'; and node 16 representing a string match of 'CONTENTS.' A table 504 illustrates all of the possible expression matches, and the corresponding nodal paths, for the example DFA graph 500. It should be appreciated that a backward arc may also a valid arc, representing a character match between the expression being searched and input character.

In operation, the walker process 302 may evaluate the input stream one byte at a time. As an example, consider the input stream 502. The walker 302 evaluates the first character of the input stream 502 which is 'B.' The walker then proceeds to the root node to access the next node pointer associated with the character 'B.' In the example provided by the DFA graph 500, the root node only includes a valid match for the character 'C.' Therefore, the arc associated with the character 'B' is a repeating arc (not shown) comprising a next node pointer pointing back to the root node '0.'

The walker process 302 then proceeds to the next character in the input stream 502 which is 'C.' Upon locating the arc associated with the character 'C,' the walker 302 finds a next node pointer providing a valid match and pointing to node '1.' The walker process 302 then intakes the next input stream character 'O,' and proceeds to find the associated arc and next node pointer providing a valid match and leading to node '3.' Since node '3' is a mark node, the walker process 302 registers that an expression match for the string 'CON' in the input stream has been found.

Depending on the specific IDS application, the walker process 302 may proceed to evaluate the next character in the input stream 502 and analyze the character 'W.' The arc in node '3' associated with the character 'W' comprises a backward next node pointer to the root node '0' since the only valid match associated with node '3' is for the character 'T.' The walker process then proceeds to search for the arc in the root node '0' associated with the current character 'W.' Upon finding that the associated arc is a repeating arc, pointing back to the root node '0,' the walker process 302 proceeds to evaluate the next character in the input stream 502, which is 'X.'

Upon evaluating the next input character 'X,' the associated arc in the root node '0' is a repeating next node pointer since the root node does not comprise a valid match for the character 'X.' Following the same logic discussed above, the walker process 302 may then proceed to find an expression match for the string 'CONTENT' in mark node '9.' Upon reading the next character 'J,' the walker process traverses back to the root node '0' and the arc and next node pointer associated with the character 'J' are read from the root node '0.' Upon detecting a repeating arc and reaching the end of the input stream 502, the walker process 302 completes its walking of the DFA graph 500.

Typically, in the reading of each arc, the walker process 302 makes one access to external memory (e.g., low latency memory 118 or DRAM 108). These external memory accesses may be extremely costly and may require a significant amount of system resources.

In an embodiment of the present invention, a method for reducing the number of external memory accesses is presented. The number of external memory accesses may be reduced by caching portions of the DFA graph. In determining which portions of the DFA graph to cache, an accessibility ranking may be utilized. An accessibility ranking may be used to characterize the likelihood each node in a DFA graph may be accessed during a search. The accessibility ranking may be based on DFA geometrical configurations. Thus, the motivation of caching is to identify a small percentage of graph components which may be cached. This may result in less external memory accesses, resulting in lower DRAM bus utilization and improved throughput. This also allows for the use of cheaper higher density main stream memory for graph storage as opposed to special costly low density latency memories.

As the DFA graph is being generated by the compiler 304, the compiler may access each node to determine its accessibility ranking. The accessibility ranking may be evaluated based on an in-degree and/or out-degree of a node. The in-degree of a node is a measure of the number of arcs pointing to a node, while the out-degree of a node is a measure of the number of arcs pointing from a node.

As an example, node '4' of DFA graph 500 comprises an in-degree of one since only one arc, or valid next node pointer associated with the character 'T,' is directed towards the node. Node '4' comprises an out-degree of two since two arcs, or next node pointers (e.g., the next node pointer associated with the character 'I' and the next node pointer associated with the character 'E') are directed from node '4.' Similarly, node '3' comprises an in-degree of one (e.g., the valid next node pointer associated with the character 'N') and an out-degree of one (e.g., the valid next node pointer associated with the character 'T'). Therefore, since node '4' comprises an out-degree two times greater than the out-degree of node '3,' and therefore, node '4' will have a greater likelihood of being accessed. Thus, node '4' will be assigned a higher accessibility raking than node '3.'

The accessibility ranking of each node may also be determined based on a node's distance from the root node '0.' For example, node '1' may be assigned a higher accessibility ranking than node '8' since node '1' comprises a smaller nodal distance from the root node '0' than node '8.' All of the expression matches ('CON,' 'CONTENT,' 'CONTEXT,' 'CONTINUE,' 'CONTINUUM,') must traverse node '1' before reaching a respective mark node. In contrast, node '8' will only be traversed while searching for the expression 'CONTEXT.'

The accessibility ranking may be further determined based on a heaviness of an arc. The heaviness of an arc is defined by the number of expression patterns utilizing the arc. For example, consider the arc pointing to node '3' for the character 'N.' This arc is utilized by all the expressions to be searched in the DFA graph 500 (e.g., the expressions 'CON,' 'CONTENT,' 'CONTENTS,' 'CONTEXT,' 'CONTINUE,' AND 'CONTINUUM' all make use of the arc along its nodal path). In contrast, the arc pointing to node '9' for the character 'T' is only utilized by two searched expressions (e.g., the expressions 'CONTENT,' and 'CONTENTS' are the only expressions with make use of this arc). Therefore, the arc associated with the character 'N' and pointing to the node '3' comprises a greater heaviness than the arc associated with the character 'T' and pointing to the node '9.' Nodes associated with arcs that comprise a greater degree of heaviness may comprise a greater accessibility ranking. It should be appreciated that DFA graph sub-sections may also be given a high accessibility ranking. For example, the sub-section of nodes '4'-'6' may deemed highly accessible on the basis of in- and out-degrees, nodal position from the root node, and heaviness. DFA graph sub-sections may be cached together to reduce the number of memory accesses. It should also be appreciated that any of the above mentioned methods for determining an accessibility ranking may be employed. Either method may be used in any combination. All the above methods may be employed with different weights for each method to determine final accessibility ranking of a node. It should also be appreciated that all the above mentioned methods are inter-dependent.

Figure 6:
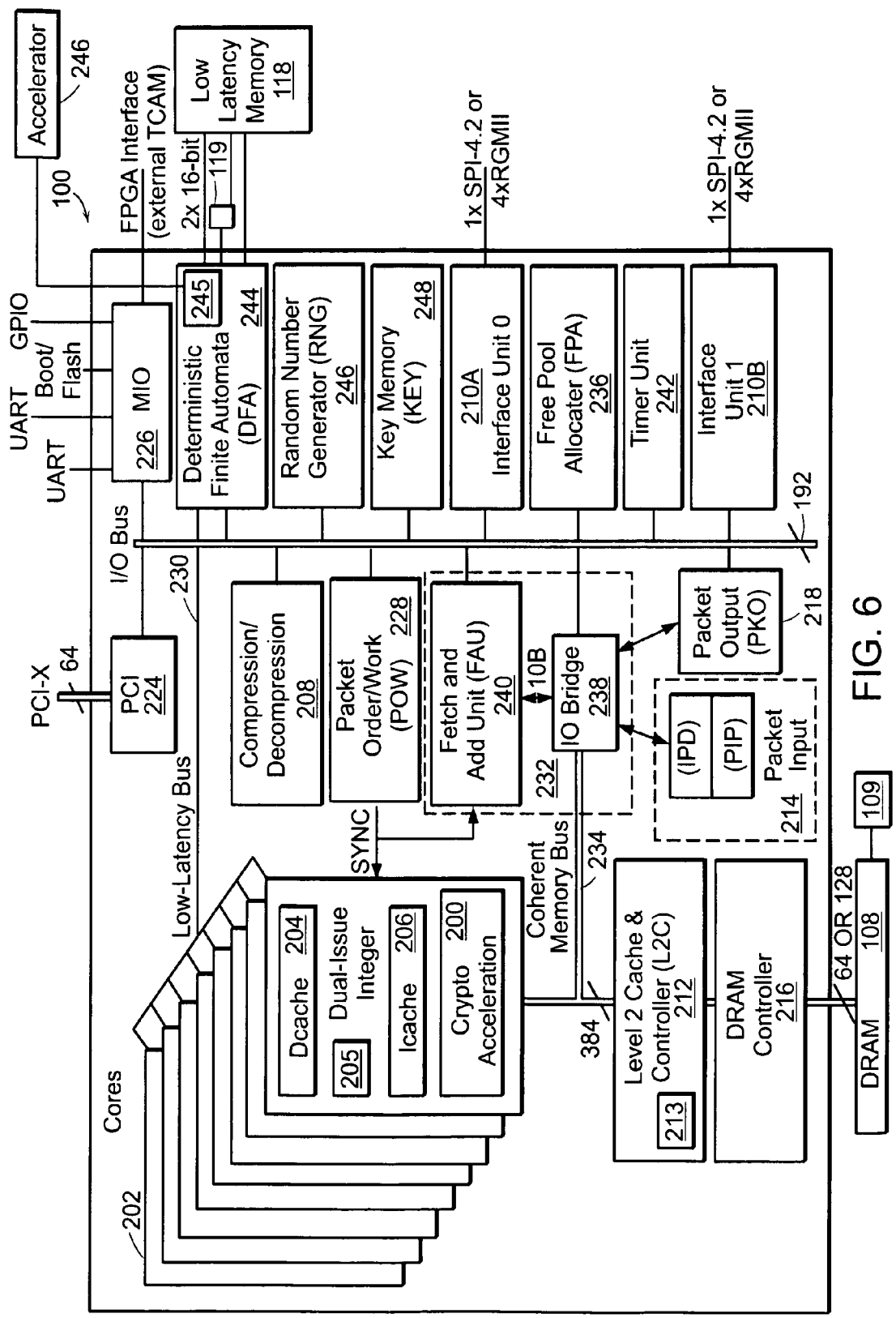
FIG. 6 is a block diagram of the network services processor shown in FIG. 2 including DFA cache memory units.

Thus, based on the accessibility ranking, which may be determined by the compiler during a compiling stage, nodes, or sub-sections of the DFA graph may be chosen for caching. As illustrated in FIG. 6, the cache may be located on-chip, for example, on-chip memory 205 located in level 1 and on-chip memory 213 located in level 2 may be used for graph storing and caching. The nodes comprising higher accessibility rankings may also be stored in the data cache memory 204 and the level 2 cache 212. Additionally, the DFA co-processor 244 may also comprise memory storage 245 used for storing and caching high accessibility DFA nodes or sub-sections. Both the low latency memory 118 and the DRAM 108 may also comprise dedicated DFA storage and caching. External memory 119 and 109 may also be used for dedicated DFA storage and caching. Additionally, an external accelerator 246 may be used to store and perform all CSM operations. A walker process running in the DFA 244 or accelerator 246 may have functionally based from hardware principles. A walker process running in the processors 202 may have functionality based from software principles. It should be appreciated that the level 1 and level 2 storage and cache 205 and 213, respectively, may be dedicated solely to DFA usage. Therefore, by caching the high accessibility nodes and DFA sub-sections, the number of external memory access may be greatly reduced. Furthermore, a node of sub-section of a DFA graph may be cached once the accessibility ranking has reached a pre-determined threshold value.

It should be appreciated that the walker may also be configured to walk the graph in the graph cache as well as main memory. The graph may be generated in a manner allowing each arc to include information if the node it is pointing to is stored in the graph cache or in main memory. The walker may use this information to determine whether or not to access the next arc in the graph cache or in main memory.

It should also be appreciated that the node structure of a node stored in a graph cache may be different from the node structure stored in external memory. The node structure of a node stored in the graph cache may be optimized as compared to the node structure of a node stored in the main memory.

While this invention has been particularly shown and described with references to example embodiments thereof, it will be understood by those skilled in the art that various changes in form and details may be made therein without departing from the scope of the invention encompassed by the appended claims.

What is claimed is:

1. In a services processor, a computer implemented method for caching a deterministic finite automata-based graph, the method comprising: analyzing nodes in the graph to search for cacheable portions of the graph by: i) determining an accessibility ranking for each node, the accessibility ranking characterizing the likelihood each node will be accessed during a search for a pattern described by a regular expression in an input string, and ii) optimizing a node structure of each node to be cached, and iii) selecting the cacheable portions of the graph based on the accessibility rankings of the nodes during a graph compilation stage; and
  caching the cacheable portions of the graph during a loading stage of the graph;
  traversing the cacheable portions of the graph in a cache with a walker process; and
  further traversing non-cacheable portions of the graph with the walker process in a main memory;
  wherein each node comprises at least one arc pointing to the node, the method further comprising:
  reading a location indicator associated with each arc to determine if a next node is in the cache.

2. The method of claim 1 wherein determining the accessibility ranking comprises:
  evaluating a distance from a node to a root node, wherein a smaller distance from a node to a root node results in a higher accessibility ranking.

3. The method of claim 1 wherein determining the accessibility ranking further comprises:
  evaluating an in-degree and an out-degree of a node, wherein a greater in-degree or out-degree of the node results in a higher accessibility ranking.

4. The method of claim 1 wherein determining the accessibility ranking comprises:
  evaluating a heaviness of a node, wherein a heavier node comprises a higher accessibility ranking.

5. The method of claim 1 wherein caching further comprises storing and retrieving graph data from an on-chip memory location.

6. The method of claim 1 wherein caching further comprises storing and retrieving graph data from a memory location dedicated to graph usage.

7. The method of claim 1 wherein determining the accessibility ranking comprises:
  adjusting the accessibility ranking during a search of the graph, wherein the accessibility ranking of frequently accessed nodes is increased.

8. The method of claim 7 wherein upon the adjusted accessibility ranking of a node reaching a threshold value, that node is cached.

9. A services processor comprising:
  a processing unit configured to analyze a searchable graph including a plurality of interconnected nodes to search for cacheable portions of the graph by: i) determining an accessibility ranking for each node, the accessibility ranking characterizing the likelihood each node will be accessed during a search for a pattern described by a regular expression in an input string, and ii) optimizing a node structure of each node to be cached, and iii) selecting the cacheable portions of the graph based on the accessibility rankings of the nodes during a graph compilation stage; and
  a cache configured to cache the cacheable portions of the graph during a loading stage of the graph; and
  a walker process configured to walk the cacheable portions of the graph in the cache and further configured to walk non-cacheable portions of the graph in a main memory;
  wherein each node comprises at least one arc pointing to the node, the walker process further configured to read a location indicator associated with each arc to determine if a next node is in the cache.

10. The processor of claim 9 wherein the processing unit is configured to determine the accessibility ranking by evaluating an in-degree and an out-degree of a node, wherein a greater in-degree or out-degree of the node results in a higher accessibility ranking.

11. The processor of claim 9 wherein the processing unit is configured to determine the accessibility ranking by evaluating a distance from a node to a root node, with nodes closer to the root node having a higher accessibility ranking.

12. The processor of claim 9 wherein the processing unit is configured to determine the accessibility ranking by evaluating a heaviness of a node, wherein a heavier node comprises a higher accessibility ranking.

13. The processor of claim 9 wherein the cache is located in an on-chip memory unit.

14. The processor of claim 13 wherein the cache is dedicated to graph usage.

15. The processor of claim 9 wherein the processing unit is further configured to adjust the accessibility ranking during a search of the graph, with the accessibility ranking increased if a node is frequently accessed.

16. The processor of claim 9 wherein the cache is further configured to cache the cacheable portions of the graph based on an adjusted accessibility ranking.

* * * * *